UNITED STATES PATENT OFFICE.

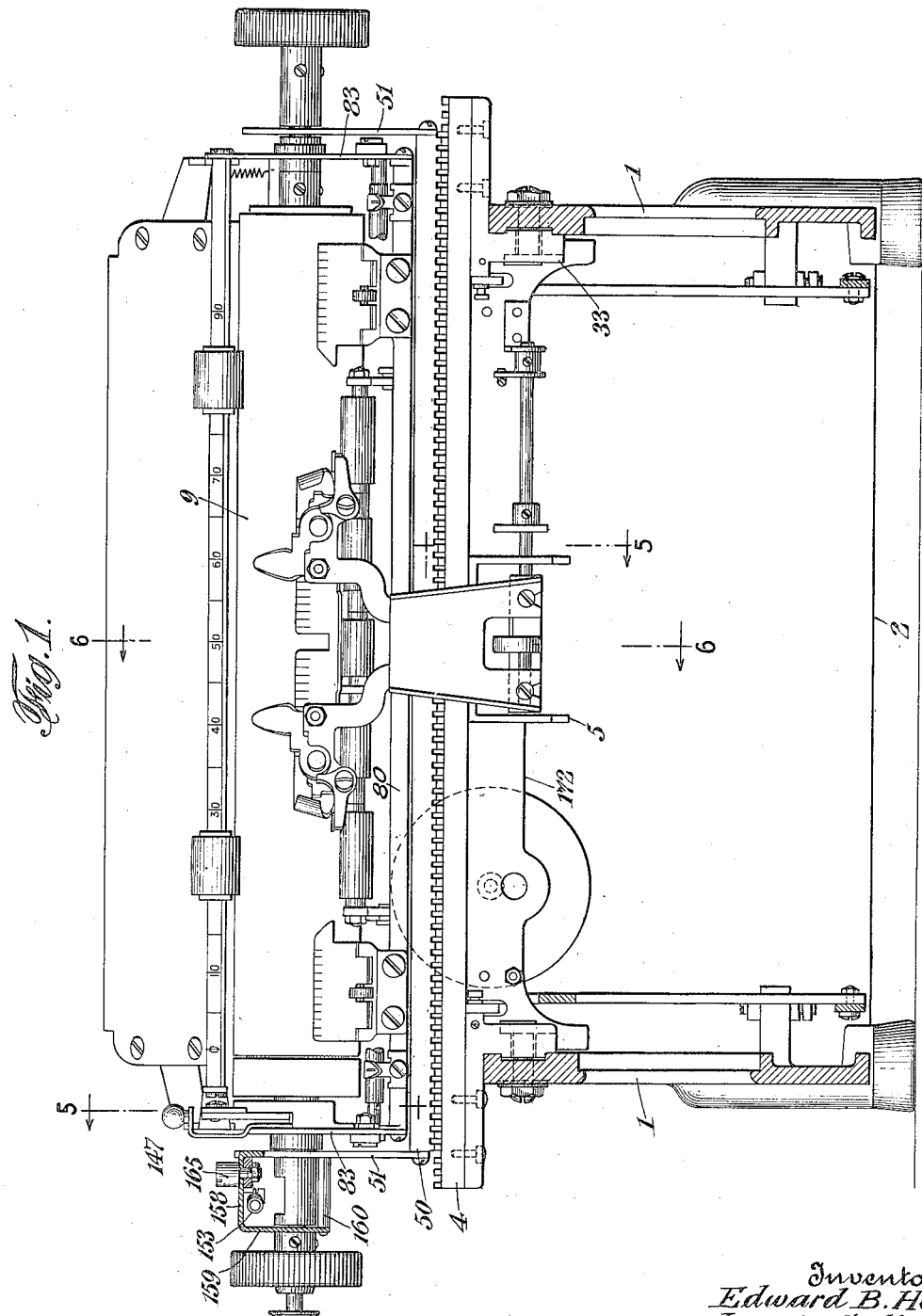

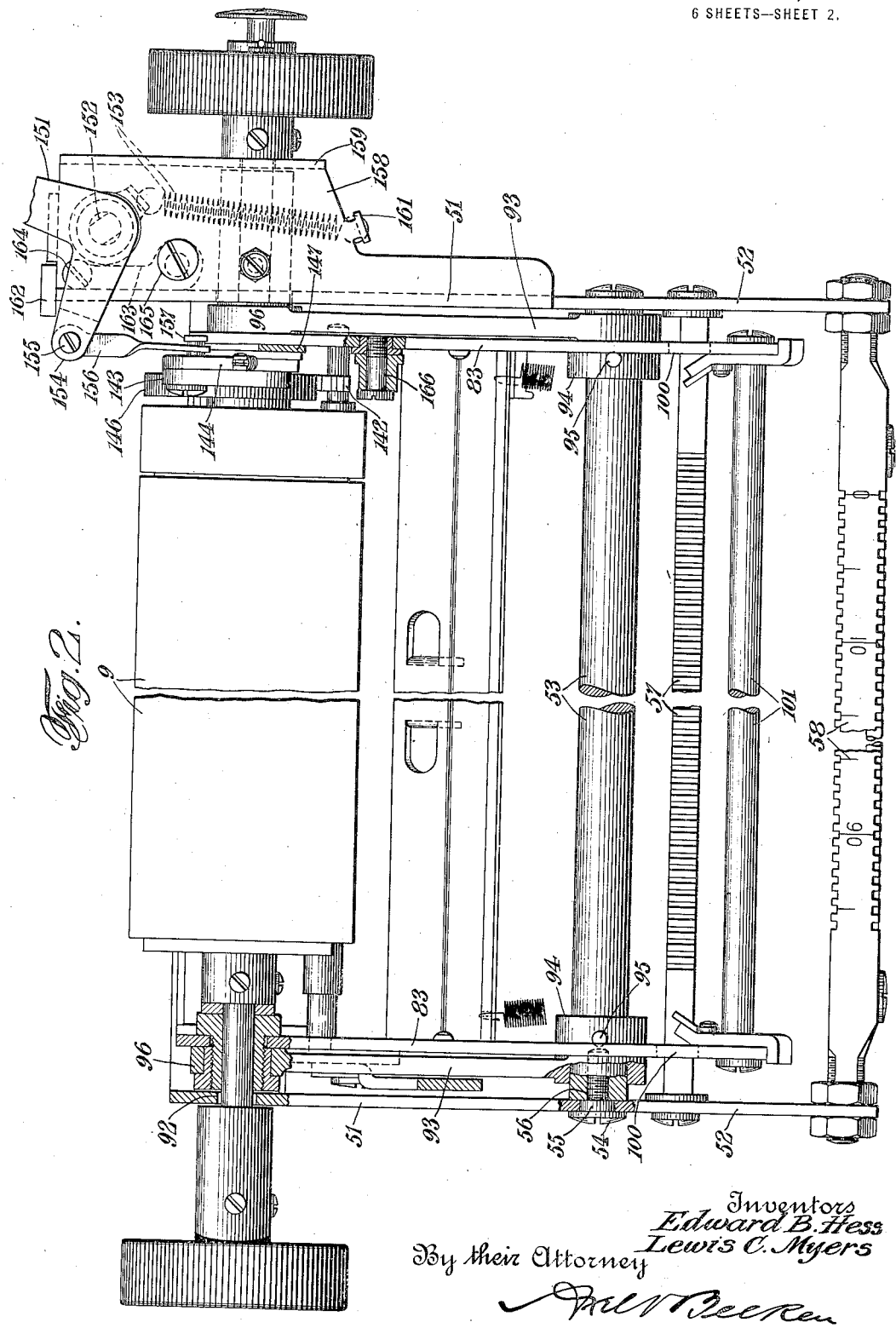

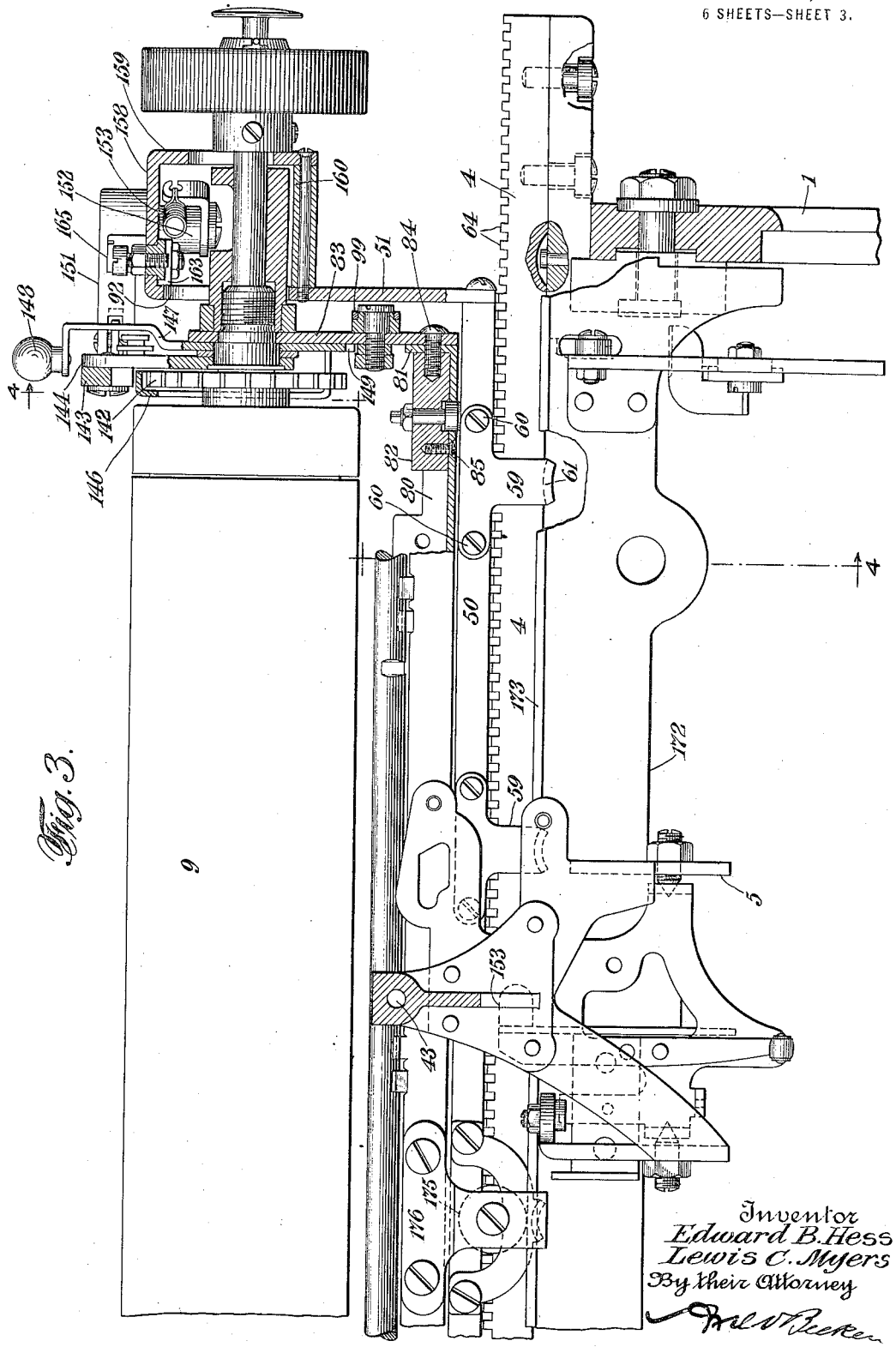

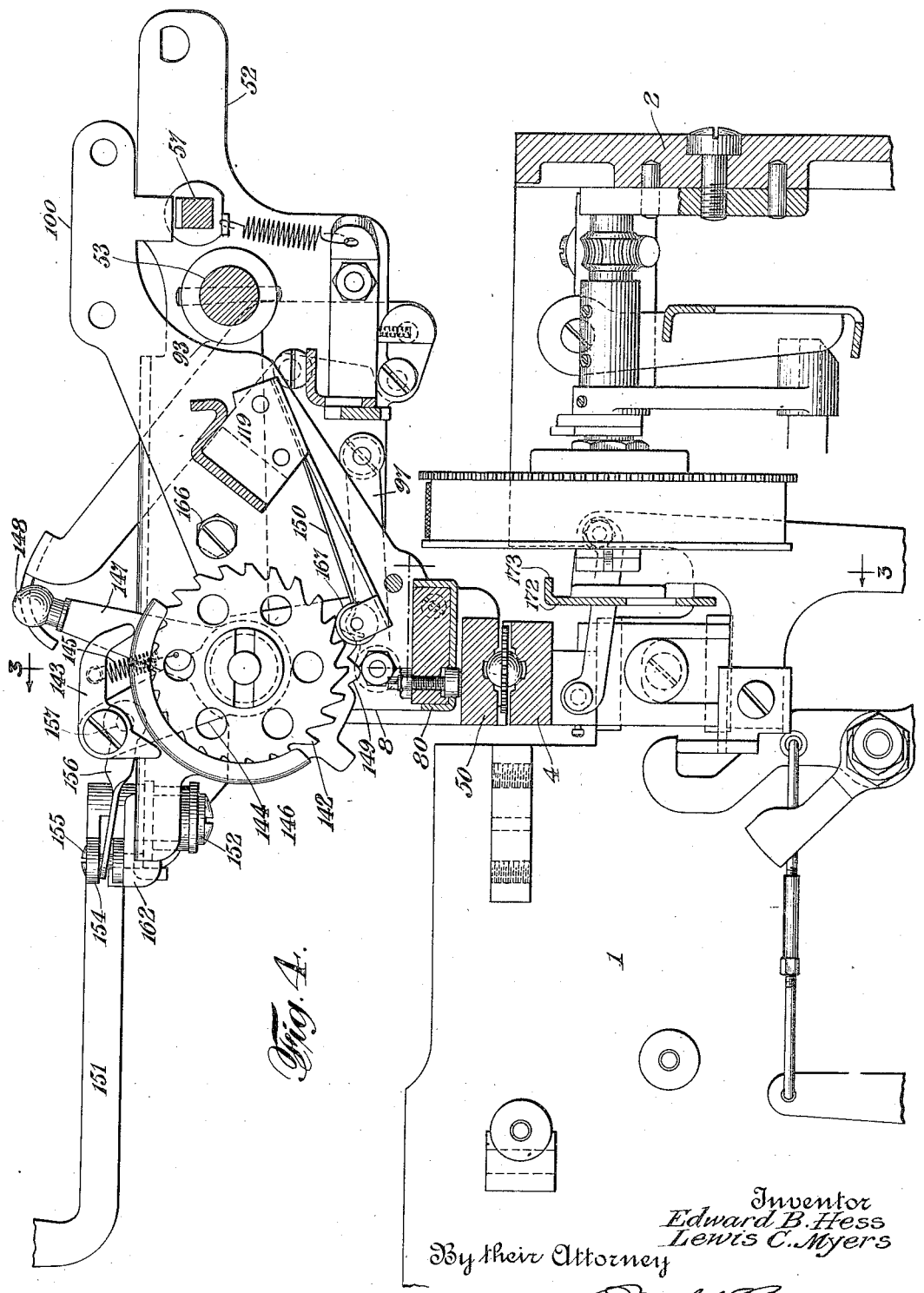

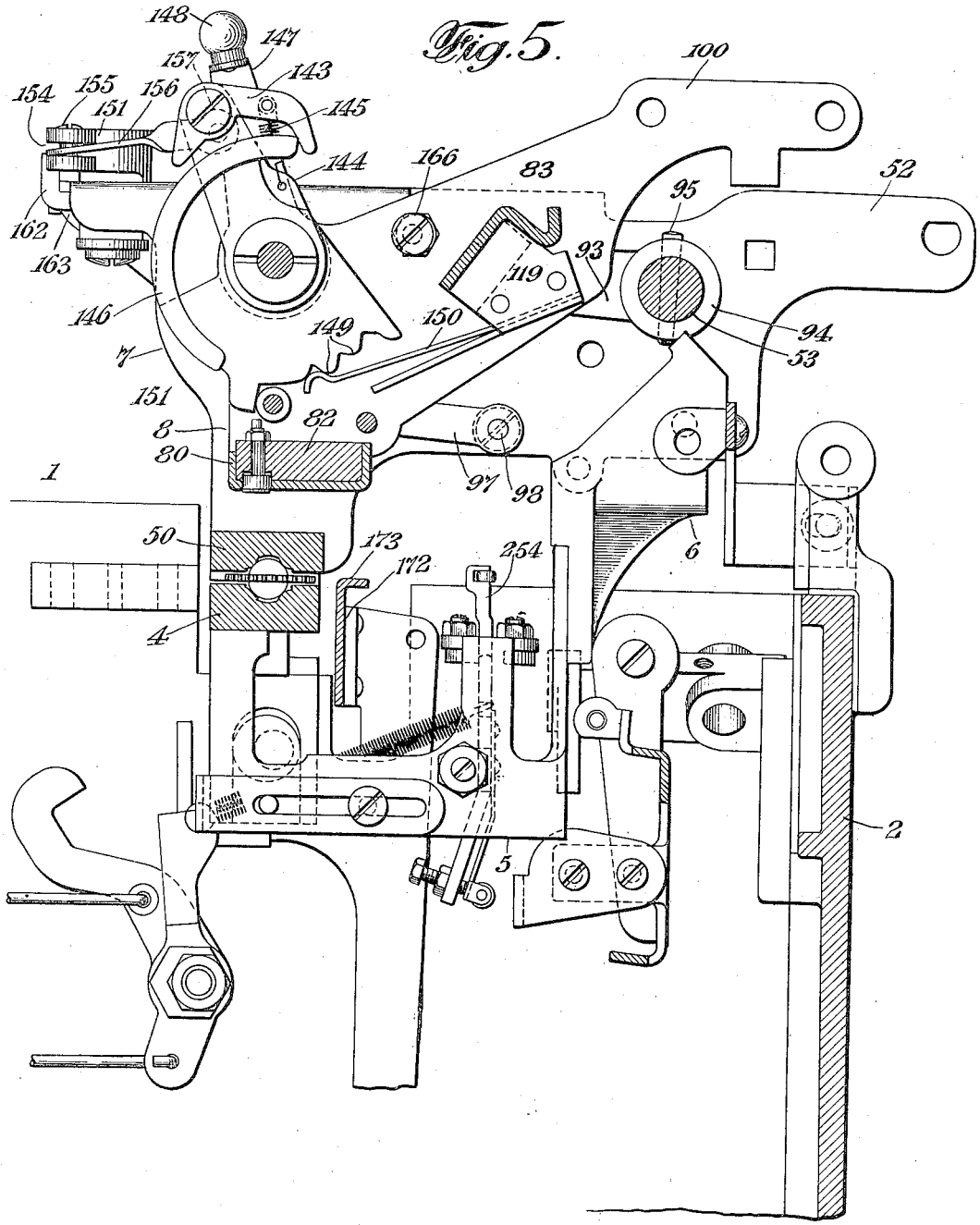

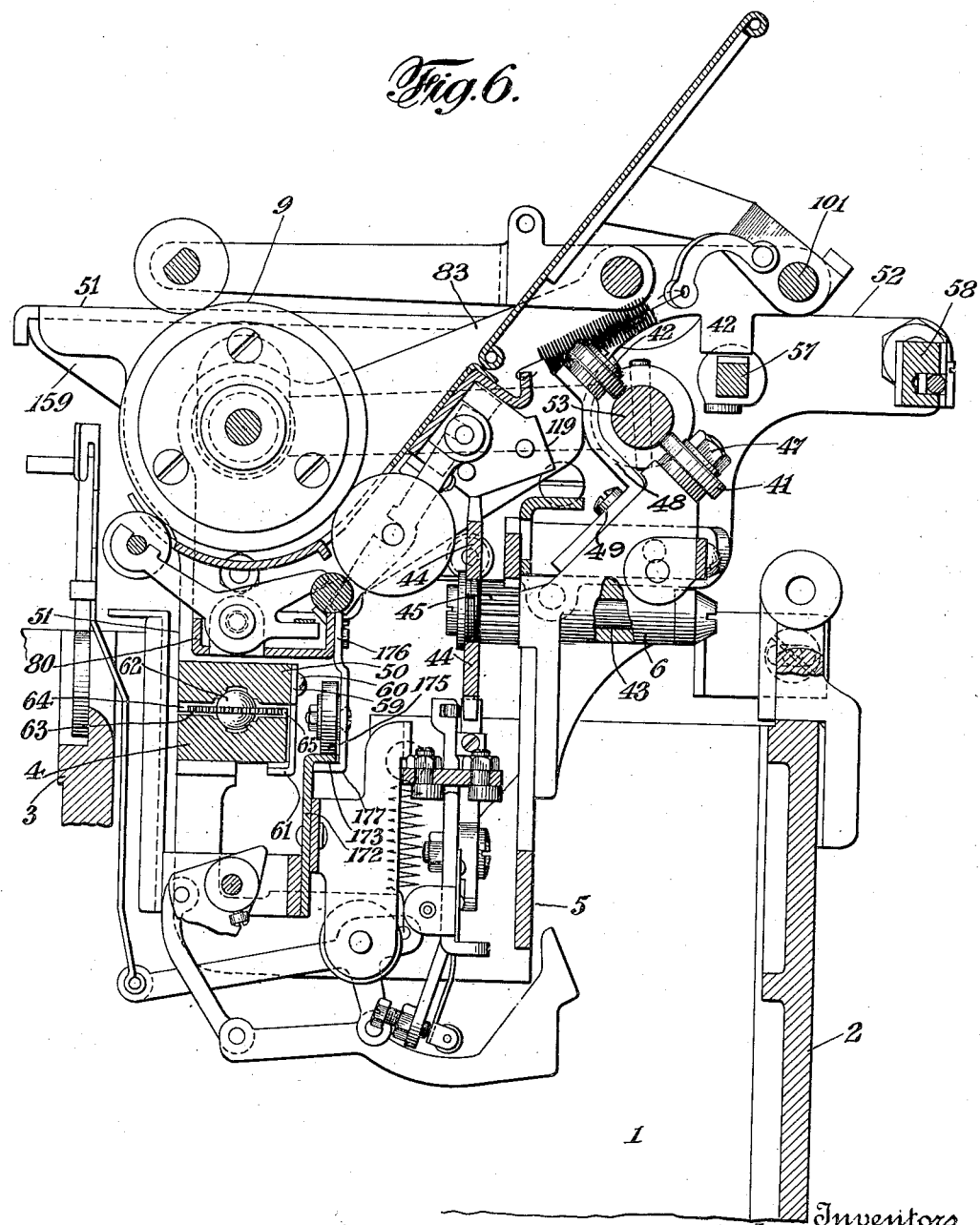

EDWARD B. HESS AND LEWIS C. MYERS, OF BROOKLYN, NEW YORK, ASSIGNORS TO ROYAL TYPEWRITER COMPANY, INC., OF NEW YORK, N. Y., A CORPORATION OF NEW YORK.

TYPEWRITING MACHINE.

1,427,468.     Specification of Letters Patent.     Patented Aug. 29, 1922.

Original application filed May 11, 1920, Serial No. 380,601. Divided and this application filed July 27, 1920. Serial No. 399,376.

*To all whom it may concern:*

Be it known that we, EDWARD B. HESS and LEWIS C. MYERS, citizens of the United States of America, and residents of the city of New York, in the borough of Brooklyn, county of Kings, and State of New York, have invented certain new and useful Improvements in Typewriting Machines, of which the following is a specification.

This invention relates to typewriting machines and is a division of application Ser. No. 380601, filed May 11, 1920 disclosing an improvement in the well known Royal typewriter, the essential feature of which resides in the fact that the shiftable platen carriage is mounted on the transversely traveling carriage. The main feature and object of this invention is the provision of means whereby line-space advancing means located partly on the transversely traveling carriage and partly on the shiftable carriage may co-act properly regardless of whether or not the platen is in normal or shifted position.

In the accompanying drawings:

Fig. 1 is a vertical transverse sectional view in front of the platen, with the keyboard and typebars omitted:

Fig. 2 is a top plan view of the platen and adjacent elements, with parts broken away and in section.

Fig. 3 is a vertical sectional view adjacent the left-hand end of the platen, looking from the rear: and Figs. 4, 5 and 6 are sectional views taken longitudinally of the machine at different points, transversely through the platen and adjacent elements.

The framing of the machine consists of the main frame work having side walls 1 and a rear wall 2 and supplementary framing comprising a segment support 3, lower stationary raceway 4, extending transversely across the machine and supported in the side walls 1, together with escapement framing extending longitudinally of the machine and consisting of an escapement frame 5 connected with the underside of lower raceway 4, and escapement wheel support 6 connected with the escapement frame and with the rear wall 2.

Supported on the lower raceway 4 is a transversely movable carriage 7 in which is supported a shiftable carriage 8 carrying the platen 9, the said shiftable carriage being raised and lowered by means of shift rail 172 extending transversely across the machine above the escapement frame and in rear of lower raceway 4.

The lower ball race 4 constitutes what may be termed a "mono-rail" support for the transversely traveling carriage 7, additional means for supporting the overhang of said carriage being provided on the escapement framing, said additional means here taking the form of two guide rollers 41 and 42. Escapement wheel support 6 is provided with a bushing 43 for the reception of the spindle of escapement wheel 44 and escapement pinion 45 and has an aperture for the reception of screw 47 that holds the guide roller 41 in position. Guide roller 42 is carried by a plate 48 secured to support 6 by means of screw 49.

The transversely traveling carriage is composed of traveling ball race 50 and end standards 51 provided with rearwardly extending overhanging portions 52 in which are mounted a transversely extending guide rod 53 (which here takes the form of a rockshaft) that engages rollers 41 and 42. In the form here disclosed, rock shaft 53 is held at each end by a bearing screw 54 having a bearing portion 55 fitting in an opening in overhang 52 and provided with a threaded stem 56 in engagement with a threaded opening in said rock shaft. 57 indicates a margin rail and 58 is a tabular bar, both of which are connected with overhanging portions 52 and which, in addition to the primary function implied by their names, also act as stay rods for the traveling carriage. 59 indicates clamps that are attached by means of screws 60 to upper ball race 50 and provided with horizontally extending and curved guide portions 61 that engage the underside of lower ball race 4. Between the upper and lower raceways are the usual balls 62 having encircling gears 63 engaging with racks 64 and 65 of side raceways.

The shiftable carriage 8 is constructed as follows:—80 is a transversely extending and horizontally disposed channel member of sheet metal having bent ends 81 adjacent which are filling blocks 82. Said channel member is connected with end walls 83 of the shiftable carriage by means of screws 84 that pass through walls 83, ends 81 and into filling blocks 82. Channel member 80 and filling block 82 are also connected together by means of counter-sunk screws 85 and suitable bumper stops are carried by filling blocks 82, said stops engaging with the upper side of upper raceway 50. The shaft of platen 9 extends through end walls 83 in such manner that the platen is freely rotatable in said end walls; and said platen shaft also extends through vertical slots 92 in end standards 51 of the traveling carriage. The shiftable carriage is mounted in two pairs of parallel arms carried by the traveling carriage. One pair of these arms 93 are supported on the transversely extending guide rod 53 which, as previously pointed out, is a rock shaft with which the guide rollers 41 and 42 engage, each of these arms being provided with a bushing 94 secured to said rock shaft by pins 95 and the outer ends of arms 93 being provided with sleeves 96 through which the platen shaft passes. The other pair of parallel arms 97 are pivotally supported at 98 in end standards 51 of the transversely moving carriage and are pivotally connected at their outer ends 99 with end frame 83 of the shiftable carriage. End walls 83 of the shiftable carriage have overhanging portions 100 that are connected by a transverse brace rod 101.

Line space advancing mechanism is constructed as follows. Connected with the platen shaft is a line space ratchet 142 adapted to be actuated by a pawl 143 pivotally mounted on an arm 144 loosely supported on the platen shaft. Pawl 143 is normally urged toward the ratchet by spring 145 connected at one end with the pawl and at its other end with arm 144. 146 indicates a shield or hood for covering the ratchet more or less to vary the effective stroke of the pawl in a manner well understood. Said hood is mounted on adjusting member 147 having handle 148 and carried loosely on the platen shaft. At its lower end, member 147 is provided with teeth 149 with which engages spring detent 150 carried by a paper pan supporting bracket 119. A line space advancing lever 151 in the form of a bell crank is mounted on a vertical pivot at 152 on the traveling carriage (but not on the shiftable carriage) and is normally urged into one of its positions by spring 153. One end of bell crank 151 is bifurcated as at 154 for the reception of a pivot pin 155 on which is loosely mounted a twisted link 156 which latter is also connected with pivot pin 157 on arm 144. It will be seen that pin 155 constitutes a vertical pivot and pin 157 a horizontal pivot for twisted link 156 and that the connection is in effect a universal joint. It will be seen that the connection of link 156 with pin 155 is at a point substantially midway between upper and lower case position of pin 157 so that line space advance may be effected in either position from the line space advancing lever. One of the end standards 51 of traveling carriage 7 is provided with an outwardly extending portion 158 terminating in a downwardly extending portion 159, said downwardly extending portion 159 tapering downwardly, and connected at its lower end by a threaded stem and sleeve 160 with end standard 51. Pivot pin 152 of bell crank 151 is mounted in extension 158 and spring 153 is housed beneath extension 158 and attached to projection 161 at the underside of 158. 162 indicates a stop member for limiting the rearward movement of bell crank 151. This stop member is a prolongation of a plate 163 secured to the underside of extension 158 by a screw 164. 165 is an eccentrically adjustable stop member for limiting the forward movement of bell crank 151, this stop member passing through extension 158 and into plate 163. An eccentrically adjustable stop member 166 is provided on end wall 83 of the shiftable carriage for the purpose of limiting the forward movement of pawl 143. The click 167 for ratchet 142 is carried by the paper pan supporting bracket 119.

Suitable means are provided for lifting and lowering the shiftable carriage which, in this instance, comprises essentially a shift rail 172 extending transversely of the machine above the escapement frame and consisting of an angular piece of sheet metal, one face of which constitutes a horizontal track 173 on which travels the shiftable carriage traveling roller 175 carried by a suitable carriage clamp 176 having a horizontally extending guide member 177 engaging with the under side of horizontal track 173. Clamp 176 is secured in any suitable manner to channel member 80.

The feature of providing central gutters in raceways 4 and 50 is not claimed herein but forms the subject matter of another application Ser. No. 569,322 filed June 19, 1922.

So likewise the overhead bail and actuating means and the paper pan actuating means are not claimed herein but form the subject matter of another application, Ser. No. 569,321 filed June 19, 1922.

We claim—

1. In a typewriting machine: a rotatable platen and platen shaft, a shiftable carriage mounting the platen, a transversely traveling carriage mounting the shiftable carriage, a ratchet rotatable with the platen, an arm mounted loosely on the platen shaft, a ratchet pawl carried by said arm, a line space advancing lever pivoted on the transversely traveling carriage, and a link between the pawl carrying arm and the line space advancing lever connected to the latter at a point substantially midway between the upper and lower case position of said link.

2. In a typewriting machine: a rotatable platen and platen shaft, a shiftable carriage mounting the platen, a transversely traveling carriage mounting the shiftable carriage, a ratchet rotatable with the platen, an arm mounted loosely on the platen shaft, a ratchet pawl carried by said arm, a line space advancing lever pivoted on the transversely traveling carriage, a link between the pawl carrying arm and the line space advancing lever, a stop, for the line space advancing lever, on the transversely traveling carriage, and a stop, for the pawl, on the shiftable carriage.

Signed at New York city, in the borough of Manhattan, county and State of New York, this 23rd day of July 1920.

EDWARD B. HESS,
LEWIS C. MYERS.